(12) United States Patent
Calluiere et al.

(10) Patent No.: US 9,114,784 B2
(45) Date of Patent: Aug. 25, 2015

(54) CONTROL OF A WINDOW WASHER SYSTEM ASSOCIATED WITH A WIPER SYSTEM FOR A MOTOR VEHICLE

(75) Inventors: Johan Calluiere, Mareil sur Mauldre (FR); Denis Thebault, Clermont Ferrand (FR); Pierre-Emmanuel Negre, Paris (FR)

(73) Assignee: Valeo Systémes d'Essuyage, Le Mesnil Saint Denis (FR)

( * ) Notice: Subject to any disclaimer, the term of this patent is extended or adjusted under 35 U.S.C. 154(b) by 533 days.

(21) Appl. No.: 13/635,253

(22) PCT Filed: Feb. 10, 2011

(86) PCT No.: PCT/EP2011/051981
§ 371 (c)(1),
(2), (4) Date: Oct. 24, 2012

(87) PCT Pub. No.: WO2011/113648
PCT Pub. Date: Sep. 22, 2011

(65) Prior Publication Data
US 2013/0032169 A1 Feb. 7, 2013

(30) Foreign Application Priority Data
Mar. 16, 2010 (FR) ..................... 10 01043

(51) Int. Cl.
*B60S 1/48* (2006.01)
*B60S 1/52* (2006.01)

(52) U.S. Cl.
CPC ................. *B60S 1/482* (2013.01); *B60S 1/486* (2013.01); *B60S 1/522* (2013.01); *B60S 1/524* (2013.01); *B60S 1/485* (2013.01)

(58) Field of Classification Search
None
See application file for complete search history.

(56) References Cited

U.S. PATENT DOCUMENTS

| 2,743,473 A * | 5/1956 | Oishei ........................ 15/250.02 |
| 2007/0084484 A1 | 4/2007 | Porter et al. |

FOREIGN PATENT DOCUMENTS

| DE | 36 12 620 C1 | 7/1987 |
| DE | 10 2008 024357 A1 | 11/2009 |

(Continued)

OTHER PUBLICATIONS

English Machine Translation of EP 2123525 A1.*

(Continued)

*Primary Examiner* — Nicole Blan
(74) *Attorney, Agent, or Firm* — Osha Liang LLP

(57) ABSTRACT

The present invention relates to the control of a window washer system associated with a system for wiping a glazed surface of a motor vehicle, said wiper system comprising a wiper motor for rotating at least one wiper blade holder arm, and this window washer system comprising a liquid reservoir connected to at least one nozzle designed to deliver, over a wiping cycle, at least one liquid jet for at least a first window washer system activation period defined between an instant $(t_{d1})$ for initiating the spraying of the liquid and an instant $(t_{a1})$ for stopping the spraying of the liquid, these instants each being determined as a function respectively of a first angular position and of a second angular position of the wiper blade holder arm defining a first angular sector in which the spraying of the liquid is continuous. According to the invention, the instant $(t_{d1})$ for initiating the spraying is advanced by a compensation period $(t_1)$ corresponding at least to the period for feeding the liquid from the reservoir to the nozzle.

17 Claims, 2 Drawing Sheets

(56) References Cited

FOREIGN PATENT DOCUMENTS

| | | |
|---|---|---|
| EP | 2 123 525 A1 | 11/2009 |
| EP | 2123525 A1 * | 11/2009 |
| FR | 2 931 118 A1 | 11/2009 |
| GB | 2 326 083 A | 12/1998 |

OTHER PUBLICATIONS

International Search Report w/translation issued in PCT/EP2011/051981, mailed on Mar. 9, 2011 (6 pages).

* cited by examiner

CONTROL OF A WINDOW WASHER SYSTEM ASSOCIATED WITH A WIPER SYSTEM FOR A MOTOR VEHICLE

The present invention relates to the control of a window-washing system associated with, or even incorporated into, a system for wiping a glazed surface of a motor vehicle, such as the windshield and/or the rear window.

In the window-washing systems that exist today, it is known practice to arrange for the washing liquid to be spread over only a portion of the upward and/or downward travel of the wiper blade over the glazed surface.

Therefore, window-washing systems that make it possible to control the spraying when the wiper-blade arm or arms are in predefined angular zones have already been developed.

It is also known, for example from document GB 2 326 083, that an improved cleaning of a glazed surface of a motor vehicle can be obtained by arranging to bring the washing liquid alternately to the right or to the left of the blade or wiper of the wiping system depending on whether the blade is moving toward the bottom of the surface or toward the top of the surface, so that the liquid effectively wets a portion of the glazed surface that will be immediately swept by the wiping blade.

Whichever system is used, the zone of the glazed surface on which the washing liquid must be effectively sprayed over a sweeping cycle of the wiping arm, on the up stroke and/or on the down stroke, must be determined for each motor vehicle so as to inconvenience the vehicle driver as little as possible, while ensuring an effective cleaning of the glazed surface by the combined action of the spraying of liquid and of the wiping. When this zone has been determined, it is necessary to be able to determine the moments of initiation and then stopping of the spraying of liquid during a sweeping cycle.

Certain known methods are designed to control the spraying as a function of the angular position of the wiper-blade arm or arms during a sweeping cycle. The angular position of the wiper blade being itself a function of the angular position of the shaft of the motor for driving this arm, these methods are designed to equip the wiper motor shaft with a cam connected on rotation concentrically to this shaft and cooperating with contacts or shoes to deliver a liquid spraying control signal for certain angular positions only of the drive shaft.

The major drawback of these systems is that it is necessary to develop a system for each vehicle model. Specifically, the profile of the cam and the positioning of the shoes must be defined for each vehicle for which the wiping system is designed. Therefore, such solutions are costly to develop.

In order to alleviate the foregoing drawback, document EP 2123525 in the name of the Applicant describes a window-washing system integrated into a system for wiping a glazed surface of a motor vehicle, in which, on each wiping cycle, the variations in the speed of the wiper-blade arm over the glazed surface are estimated in real time as a function of parameters relating to the conditions of use of the vehicle, and then the moment of initiation and/or the moment of stopping the spraying is adapted as a consequence.

Nevertheless, the results on the matter of the precision of the spraying zone remain insufficient.

The object of the present invention is to allow the washing liquid to be sprayed exactly at the desired location on the glazed surface.

To do this, the subject of the present invention is a method for controlling a window-washing system associated with a system for wiping a glazed surface of a motor vehicle, said wiping system comprising a wiper motor for rotating at least one wiper-blade arm, and the window-washing system comprising a liquid reservoir connected to at least one nozzle capable of delivering, over a wiping cycle, at least one jet of liquid for at least one first period of activation of the window-washing system defined between a moment of initiating the spraying of the liquid and a moment of stopping the spraying of the liquid, said moments each being determined as a function respectively of a first angular position and of a second angular position of the wiper-blade arm defining a first angular sector in which the spraying of the liquid is continuous, the method being characterized in that it consists in advancing the moment of initiation of the spraying by a period of compensation corresponding to at least the period for feeding the liquid from the reservoir to the nozzle.

This dispenses with the time delays of the system which are associated with the inertia of the washing liquid and with the hydraulic architecture of the window-washing system.

Since the lack of precision may also be due to the electric/electronic processing time, it is possible advantageously to provide for the period of compensation to be also a function of this processing delay.

In a preferred embodiment, account is also taken of the conditions of use of the vehicle, such as the outside temperature, the speed of the vehicle, the rain or snow, or else the degree of dirtiness on the glazed surface in order to adjust, that is to say increase or reduce, the period of compensation.

For this preferred embodiment, the control method will also consist in estimating in real time, over each wiping cycle, the variations in speed of the wiper-blade arm over the glazed surface as a function of parameters relating to the conditions of use of the vehicle, and in determining said period of compensation also as a function of the estimated variations in speed.

A further subject of the present invention is a module for controlling a window-washing system associated with a system for wiping a glazed surface of a motor vehicle, said wiping system comprising a wiper motor for rotating at least one wiper-blade arm, and the window-washing system comprising at least one liquid reservoir and a pump capable of being connected to a washing liquid reservoir and to at least one nozzle, said pump being controlled by a control signal so as to deliver, over a wiping cycle, at least one jet of liquid for at least one first activation period of the window-washing system defined between a moment of initiating of the spraying of the liquid and a moment of stopping the spraying of the liquid, said moments each being determined as a function respectively of a first angular position and of a second angular position of the wiper-blade arm defining a first angular sector in which the spraying of the liquid is continuous, characterized in that it comprises means for advancing the moment of initiation of the spraying by a period of compensation corresponding to at least the period of feeding the liquid from the reservoir to the nozzle.

A final subject of the present invention is a wiping system comprising the control module defined above.

The invention and the advantages that it provides will be better understood in light of the following description of a nonlimiting example of a window-washing system associated with a wiping system, made with reference to the appended figures in which.

Figure 1:
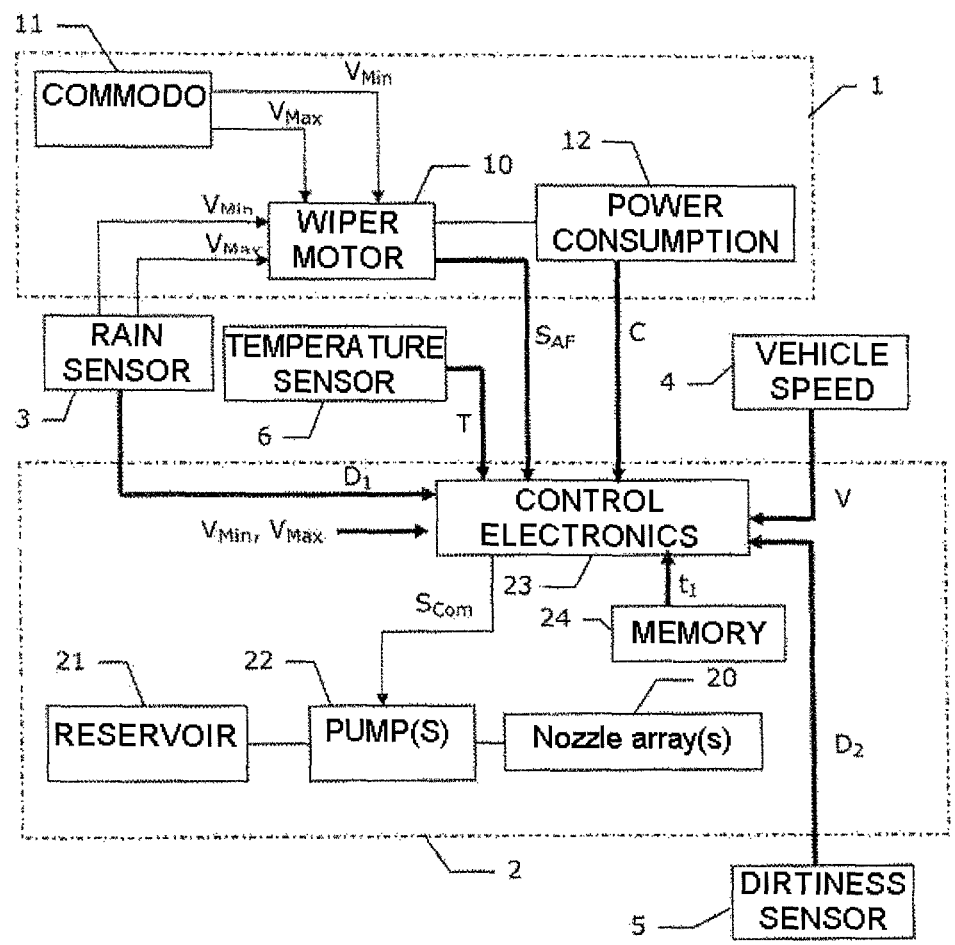
FIG. 1 represents, in a simplified block-diagram form, a window-washing system associated with a wiping system according to one possible embodiment of the invention.

With reference to FIG. 1, it shows in simplified block-diagram form certain elements of a wiping system fitted with an integrated window-washing system, and the various connections with various elements which may or may not be included in the wiping system, that allows the method for controlling the window-washing system according to the invention to be applied.

More precisely, a system making it possible to apply the control method according to the invention comprises:

- a first portion of elements specific to the operation of the wiping system, said portion being represented schematically in a subassembly bearing reference number 1;
- a second portion of elements specific to the operation of the window-washing system, said portion being represented schematically in a subassembly bearing reference number 2;
- optionally, various elements such as a rain sensor 3, a vehicle-speed sensor 4, a sensor 5 for sensing the degree of dirtiness of the glazed surface, or an outside temperature sensor 6, possibly a hydrometry sensor (not shown), these various elements not necessarily forming part of the wiping system 1 or of the window-washing system 2 itself.

The first portion 1 suitable for the operation of the wiping system conventionally comprises a wiper motor 10 used to drive in alternating rotation at least one wiper-blade arm (not shown). The wiper motor 10 is for example monodirectional, and the alternating rotation of the wiper-blade arm may be conventionally obtained by virtue of a connecting mechanism (not shown), called control gear, between the drive shaft of the motor and the wiper-blade arm. The rotation of the wiper motor is controlled either manually, for example by the activation of a commodo 11 by the driver, or automatically, for example following the detection of rain by the rain sensor 3. In both cases, the wiper motor can be controlled to rotate at at least two rotation speeds, a low speed $V_{Min}$ and a high speed $V_{Max}$. Typically, the low speed corresponds to 45 sweeping cycles per minute, while the high speed corresponds to 60 sweeping cycles per minute. An intermittent mode, which can be assimilated to the low rotation speed, also exists in most systems.

With respect to the second portion relating to the operation of the window-washing system, said system in this instance comprises, as a nonlimiting example, two nozzles or two series of nozzles 20 which may or may not be placed in an array on the wiper-blade arm or else on the wiper blade. The window-washing system is therefore integrated into the wiping system and the nozzles follow the movement of the wiper-blade arm during a wiping cycle. The two nozzles or series of nozzles 20 are placed on the arm or on the wiper blade so as to be able to direct two jets of liquid on either side of the wiper blade. These two nozzles or series of nozzles 20 are supplied with washing liquid contained in a reservoir 21 by means of a bidirectional pump 22. Depending on the direction of rotation of the bidirectional pump 22, only one nozzle or one series of nozzles makes it possible effectively, over a given sweeping portion, to generate one or more jets. The direction of rotation of the pump must be determined so that the jet is always oriented in front of the wiper blade relative to the direction of sweeping of the wiper-blade arm. Therefore, over the half of the sweeping cycle corresponding to the movement of the arm from its position called the fixed stop position to its position at the top of the glazed surface, called the position opposite to the fixed stop position, the jet will be oriented on a first side. On the other half of the sweeping cycle corresponding to the movement of the arm from its position opposite to the fixed stop position to its fixed stop position, the direction of rotation of the pump 22 must be reversed in order to allow the orientation of a jet on the other side of the wiper arm. As a first variant, the bidirectional pump could replaced by two pumps each connected to one of the two nozzles and controlled alternately. As a second variant, the bidirectional pump could be replaced by a single pump and a distributor with two outlets each connected to one of the two nozzles and controlled alternately.

In practice, the window-washing system is activated in the same way as the wiping system, that is to say either manually by a particular command on the commodo 11, or automatically following the detection of rain.

In such a system, provision is advantageously made to control the spraying during a first activation period which takes place during a rising phase of the wiper-blade arm on the glazed surface, and during a second activation period of the window-washing system which takes place during a downward phase of the wiper-blade arm on the glazed surface.

As has been indicated above, it is important for the spraying to be activated when the wiper-blade arm sweeps a certain, well-defined zone on the glazed surface.

Figure 2:
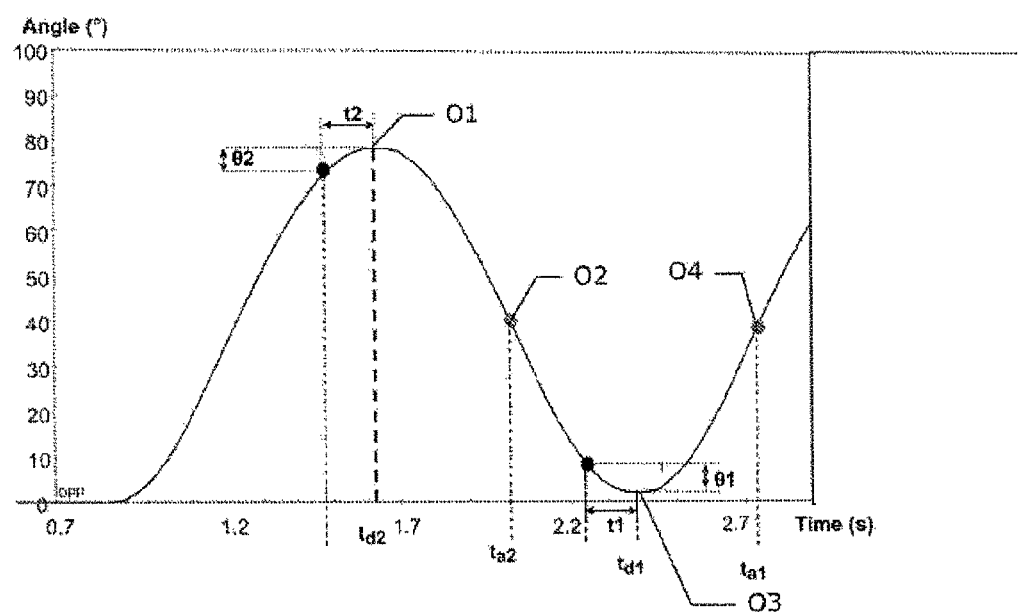
FIG. 2 illustrates the principle of the control according to the invention in the form of a timing chart over a wiping cycle.

FIG. 2 illustrates an example of time variation of the angular position of the wiper-blade arm over a sweeping cycle. It is assumed in this instance that the speed of the arm is constant, corresponding to the speed selected by the user, which explains the periodic appearance of the curve. In this example, the first activation period of the window-washing system is defined between a moment $t_{d1}$ of initiation of the spraying of the liquid and a moment $t_{a1}$ of stopping the spraying of the liquid, these moments themselves being conventionally determined each as a function respectively of a first angular position and of a second angular position of the wiper-blade arm defining a first angular sector, varying in the example between approximately 0° (corresponding to the position called the fixed stop position) and 40°. Similarly, the second activation period is defined between a moment $t_{d2}$ of initiation of the spraying of the liquid and a moment $t_{a2}$ of stopping the spraying of the liquid, these moments themselves being conventionally determined each as a function respectively of a third angular position and of a fourth angular position of the wiper-blade arm defining a second angular sector, varying in the example between approximately 80° (corresponding to the position called Opposite to the fixed stop position) and 40°.

An extreme precision will be obtained if it is ensured that the periods of activation thus defined correspond exactly to effective and continuous periods of spraying of the washing liquid.

The systems known hitherto only ensure that there will be a continuous spraying inside the activation periods, but not that the spraying will be effective from the moments $t_{d1}$ or $t_{d2}$.

This is due notably to the existence of an intrinsic delay associated with the hydraulic architecture of the window-washing system and with the inertia of the liquid.

Advantageously the invention makes provision to advance the moment of initiation of the spraying by a period of compensation corresponding at least to the period for feeding the liquid from the reservoir 21 to the nozzle 20. To do this, the control module comprises means 23, typically a control electronics element, capable of applying the period of compensation to the moment of initiation.

Since this feeding period is a function of the architecture, it can be determined in advance, for example during experimental tests making it possible to determine a mean period between the moment when the pump 22 receives a control signal $S_{COM}$ controlling its activation, and the moment when the washing liquid is effectively delivered by the nozzle or nozzles 20. The feeding period is a fixed period that is predetermined and stored in a memory 24 of the control module connected to the control means 23.

The period of compensation may furthermore also be a function of the electrical processing delay inherent in the window-washing system. Just like the delay associated with the hydraulic architecture, the electrical processing delay can be measured in advance for each system.

With reference again to FIG. 2, $t_1$ and $t_2$ indicate the periods of compensation applied respectively for the upward and downward phases of the wiping cycle. Note that the compensation can best be applied only based on the first downward phase. Nevertheless, from the first downward phase, the spraying is guaranteed at the desired point O1 of x coordinate $t_{d2}$. Similarly, from the next upward phase, only the first upward phase is guaranteed, the spraying is guaranteed at the desired point O3 of x coordinate $t_{d1}$.

Note that the system, or even the motor itself if an electronic motor is used, knows very exactly its angular position at every moment of the cycle. It is therefore totally equivalent, as illustrated in FIG. 2, to consider that the moment of initiation ($t_{d1}$, $t_{d2}$) will be advanced by a period of compensation (respectively $t_1$, $t_2$) or to consider that the angular positions occupied by the motor at the moments of initiation ($t_{d1}$, $t_{d2}$) will be modified by a corresponding angular value (respectively $\theta_1$, $\theta_2$).

In other words, the moment of initiation can be advanced by controlling the activation of the window-washing system at a moment corresponding to the moment of initiation (respectively td1, $t_{d2}$) minus said period of compensation (respectively $t_1$, $t_2$).

As a variant, the moment of initiation is advanced by controlling the activation of the window-washing system at an angular position of the wiper-blade arm corresponding to the first angular position, respectively the third angular position, corrected by an angular value, respectively $\theta_1$, $\theta_2$, corresponding to the angular movement of the wiper-blade arm for a period corresponding to said period of compensation (respectively $t_1$ or $t_2$).

Furthermore, it should be noted that the speeds $V_{Min}$ and $V_{Max}$ of the wiper motor are totally theoretical speeds that are in practice encountered only in very particular conditions of use of the vehicle (the vehicle being stationary and protected from the climatic conditions, glazed surface clean).

In practice, the time taken by the wiper-blade arm to effectively reach the spraying zone will not be a function merely of the speed $V_{Min}$ or $V_{Max}$ of the wiper motor, but will also depend on the conditions of use of the vehicle.

Thus, if the vehicle is stationary, the speed of the wiper arm over the upward phase of the arm will usually be identical to the speed of the wiper arm over the downward phase of the arm. On the other hand, if the vehicle is travelling at high speed, the arm associated with the wiping of the windshield will move much faster over the upward phase than over the downward phase. The same applies if the relative speed sustained by the wiper-blade system is considerable, because of the speed of the wind that is added to the speed of the vehicle.

Similarly, a wiper arm does not move at the same speed depending on whether the glazed surface that it sweeps is dry or wet, clean or dirty.

Therefore, according to a preferred embodiment of the invention, the period of compensation $t_1$, $t_2$ will also be advantageously adjusted as a function of the variations in speed of the wiper-blade arm over the glazed surface, estimated in real time, over each wiping cycle, based on parameters relating to the conditions of use of the vehicle.

To do this, the means 23 are capable of receiving items of information on various parameters relating to the conditions of use of the vehicle, so as to estimate in real time, over each wiping cycle, the variations in speed of the wiper-blade arm on the glazed surface as a function of these parameters. Based on these parameters, the means 23 will be able to adjust in real time each of the periods of compensation $t_1$ and $t_2$ as a function of the estimated variations in speed, and generate the control signal $s_{Com}$ of the pump 22 at the right moments.

The variations in speed of the wiper-blade arm can be estimated based on an item of information on the selected theoretical speed ($V_{Min}$ or $V_{Max}$) of sweeping of the wiping system and on an item of information on the speed of the vehicle. The item of information on the theoretical speed will be able to be obtained by the commodo 11 or the rain sensor 3 when the latter automatically initiates the wiping, and from that initiates the washing in combination. As a variant, this item of information will be able to be obtained by an output of the wiper motor to which the computing means 23 are connected. Moreover, as schematized in the figure, the control electronics element 23 can be connected to an output of the sensor 4 delivering to the computing means 23 an item of information V on the speed of the vehicle. Thus, if the speed V of the vehicle is high, the periods of compensation $t_1$ and $t_2$ should be adjusted in a distinct manner, typically by reducing the period of compensation $t_1$ of the upward phases, and by increasing the period of compensation $t_2$ of the downward phases.

In addition or as a variant, the variations in speed of the wiper-blade arm can be estimated based on a measurement of the temperature outside the vehicle, and optionally on a measurement by a hydrometry sensor.

Such an item of information specifically makes it possible to deduce an item of information on the dry or wet state of the glazed surface and to adjust in consequence the periods of compensation. To do this, the control module can be connected to an output of the sensor 6 delivering to the computing means 23 an item of information T on the vehicle temperature.

The information on the dry or wet state of the glazed surface may also be obtained from the rain sensor 3. Consequently, the variations in speed of the wiper-blade arm can also be estimated based on an item of information relating to the detection of rain, by providing that the control module be connected to an output of the sensor 3 delivering to the computing means 23 an item of information $D_1$ on the detection of rain.

As a variant or in combination, it is possible also to make provision to use an item of information $D_2$ relating to the degree of dirtiness of the glazed surface, supplied to the computing means 23 by the output of the sensor 5 for sensing the dirtiness of the glazed surface. Thus, if the glazing is very dirty, the speed of sweeping will be lower than the chosen theoretical speed. In this case, the periods of compensation $t_1$ and $t_2$ should be reduced for the upward and downward phases, at least for a certain number of cycles.

As a variant or in combination, it is also possible to make provision to measure the forces sustained by the spindle of the wiper motor in order to estimate the power consumption of this motor 10. In this case, the computing means 23 receive this information delivered by a means 12 for measuring the power consumption of the wiper motor.

It is easy to understand that, as a function of the type of sensors with which the vehicle is fitted, various adjustments of the periods of compensation will be able to be made, some aimed at increasing, others at reducing the periods of compensation, all the adjustments being added in relative value in order to give optimized values of the periods of compensation. The values of the adjustments to be made in each of the cases will be able to be established experimentally and stored in the system in table form.

As a replacement for the various aforementioned sensors, it is possible advantageously to make provision to use a wiper motor of the electronic type. Specifically, in this case, the motor may itself, at any time, compute its variations in speeds from one cycle to the other or even within one and the same cycle, and deliver these items of information to the means 23 in order to allow an adjustment of the periods of compensation.

Other alternatives are possible without departing from the context of the invention:

Thus, the invention can also be applied to a wiping system with integrated window washer for which the nozzle or nozzles are placed such that the spraying can be carried out only on an upward phase, or a downward phase, of the arm over a sweeping cycle, or else to a window-washing system for which one or more nozzles are placed in fixed manner on the hood of the vehicle. Moreover, it is of little importance whether the spraying of the liquid is carried out in front of or behind the wiper blade relative to the trajectory followed by the wiper blade during wiping.

Moreover, the control electronics 23 have been represented in FIG. 1 as forming part of the window-washing system. Nevertheless, these electronics may also be located on the wiping system, or even in the electronics of the motor if a motor of electronic type is used.

The invention claimed is:

1. A method for controlling a window-washing system associated with a system for wiping a glazed surface of a motor vehicle, said wiping system comprising a wiper motor for rotating at least one wiper-blade arm, and the window-washing system comprising a liquid reservoir connected to at least one nozzle capable of delivering, over a wiping cycle, at least one jet of liquid for at least one first period of activation of the window-washing system defined between a moment of initiating the spraying of the liquid and a moment of stopping the spraying of the liquid, said moments each being determined as a function respectively of a first angular position and of a second angular position of the wiper-blade arm defining a first angular sector in which the spraying of the liquid is continuous, the method comprising:

advancing the moment of initiation of the spraying by a period of compensation corresponding to at least the period for feeding the liquid from the reservoir to the at least one nozzle.

2. The control method as claimed in claim 1, wherein the moment of initiation is advanced by controlling the activation of the window-washing system at a moment corresponding to said moment of initiation minus said period of compensation.

3. The control method as claimed in claim 1, wherein the moment of initiation is advanced by controlling the activation of the window-washing system at an angular position of the wiper-blade arm corresponding to said first angular position corrected by an angular value corresponding to the angular movement of the wiper-blade arm for a period corresponding to said period of compensation.

4. The control method as claimed in claim 1, wherein the feeding period is a predetermined fixed period.

5. The control method as claimed in claim 1, wherein the period of compensation is also a function of the electrical processing delay inherent in the window-washing system.

6. The control method as claimed in claim 1, further comprising estimating in real time, over each wiping cycle, the variations in speed of the wiper-blade arm over the glazed surface as a function of parameters relating to the conditions of use of the vehicle, wherein said period of compensation is also a function of the estimated variations in speed.

7. The control method as claimed in claim 6, wherein the variations in speed of the wiper-blade arm are estimated based on an item of information on a selected theoretical speed of sweeping of the wiping system and on an item of information on the speed of the vehicle.

8. The control method as claimed in claim 7, wherein the variations in speed of the wiper-blade arm are estimated based on one selected from the group consisting of a measurement of the temperature (T) outside the vehicle, an item of information relative to the detection of rain, an item of information relating to the degree of dirtiness of the glazed surface, and an item of information relating to the power consumption of the wiper motor.

9. The control method as claimed in claim 8, wherein the window-washing system further comprises at least one additional nozzle placed on said wiper-blade arm or on the wiper blade, the at least one additional nozzle being capable of delivering, over a wiping cycle, at least one jet of liquid for a second period of activation of the window-washing system corresponding to a descending phase of the wiper-blade arm on the glazed surface, wherein the moment of initiation and the moment of stopping of the spraying corresponding to said second activation period are each determined as a function respectively of a third angular position and of a fourth angular position of the wiper-blade arm defining a second angular sector in which the spraying of the liquid is continuous, and the method further comprising advancing the moment of initiation of the spraying by a value equal to said period of compensation.

10. The control method as claimed in claim 6, wherein the motor is an electronic motor, as a result of which the variations in speed of the wiper-blade arm are estimated based on speed variations delivered by the motor.

11. The control method as claimed in claim 1, wherein said first activation period takes place during a rising phase of the wiper-blade arm on the glazed surface.

12. The control method as claimed in claim 10, wherein the moment of initiation of the wiping system is determined by an item of information relating to a fixed stop position delivered by the wiper motor.

13. The control method as claimed in claim 1, wherein said at least one nozzle is placed on said wiper-blade arm or on the wiper blade.

14. A module for controlling a window-washing system associated with a system for wiping a glazed surface of a motor vehicle, the wiping system comprising a wiper motor for rotating at least one wiper-blade arm, the window-washing system comprising at least one liquid reservoir and a pump capable of being connected to a washing liquid reservoir and to at least one nozzle, said pump being controlled by a control signal so as to deliver, over a wiping cycle, at least one jet of liquid for at least one first activation period of the window-washing system defined between a moment of initiating the spraying of the liquid and a moment of stopping the spraying of the liquid, said moments each being determined as a function respectively of a first angular position and of a second angular position of the wiper-blade arm defining a first angular sector in which the spraying of the liquid is continuous, wherein the module comprises computing means for advancing the moment of initiation of the spraying by a period of compensation corresponding to at least the period of feeding the liquid from the reservoir to the at least one nozzle.

15. The control module as claimed in claim 14, wherein the control module is operatively connected to an output of the wiper motor delivering to the computing means an item of information on a theoretical speed of the wiper motor and to an output of a sensor of a speed of the vehicle delivering to the computing means an item of information on the speed of the vehicle.

16. The control module as claimed in claim 15, wherein the control module is configured to connect to one selected from the group consisting of:
- an output of a rain sensor delivering to the computing means an item of information relating to the detection of rain,
- a sensor for sensing dirtiness of the glazed surface, said sensor delivering to the computing means an item of information on a degree of dirtiness of the glazed surface,
- a temperature sensor delivering to the computing means an item of information on the temperature outside the vehicle, and
- a measuring means delivering to the computing means an item of information on the power consumption of the wiper motor,
- wherein the computing means estimate in real time, over each wiping cycle, variations in speed of the wiper-blade arm on the glazed surface as a function of the signals received from the sensors, and adjust said period of compensation as a function of the estimated variations in speed.

17. A system for wiping a glazed surface of a motor vehicle, comprising a control module as claimed in claim 14.

* * * * *